R. A. WEAGANT.
WIRELESS TELEGRAPHY.
APPLICATION FILED FEB. 24, 1915.
1,306,208.
Patented June 10, 1919.
2 SHEETS—SHEET 1.
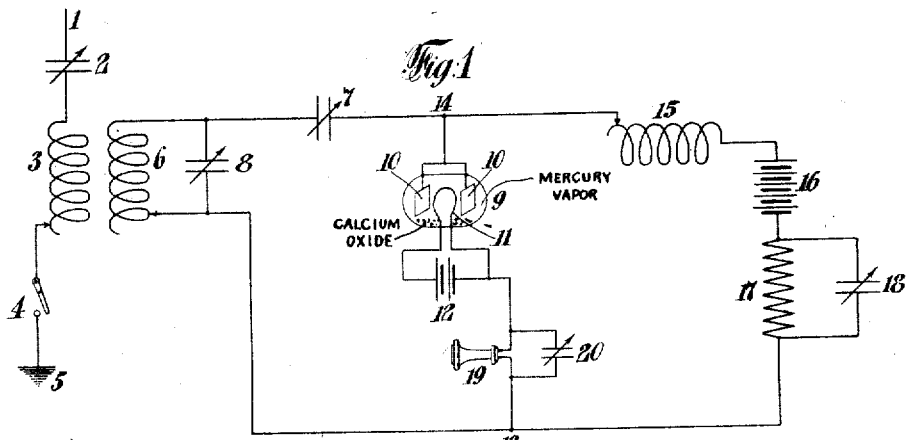
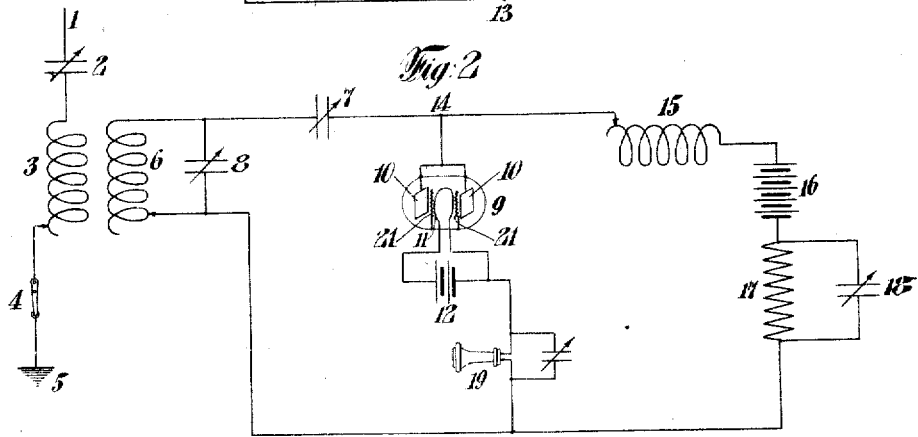
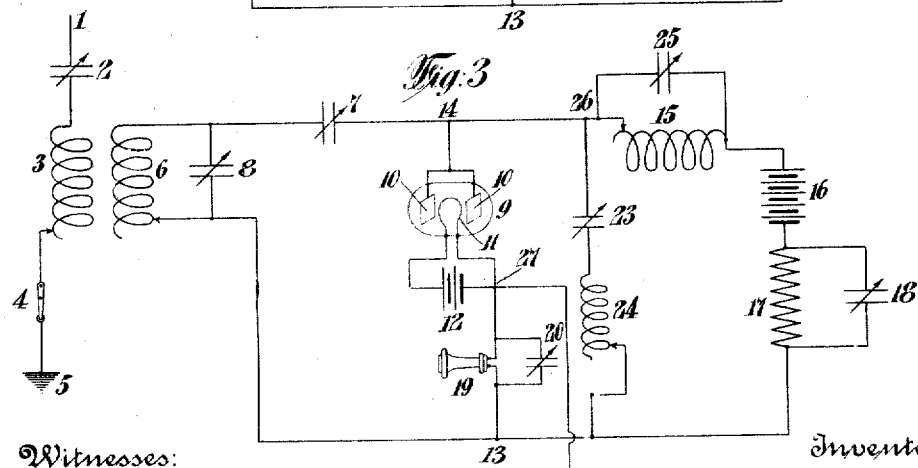
Witnesses:
John E. Prager
A. Worden Gibbs
Inventor
Roy A. Weagant
By his Attorney R. A. WEAGANT.
WIRELESS TELEGRAPHY.
APPLICATION FILED FEB. 24, 1915.
1,306,208.
Patented June 10, 1919.
2 SHEETS—SHEET 2.
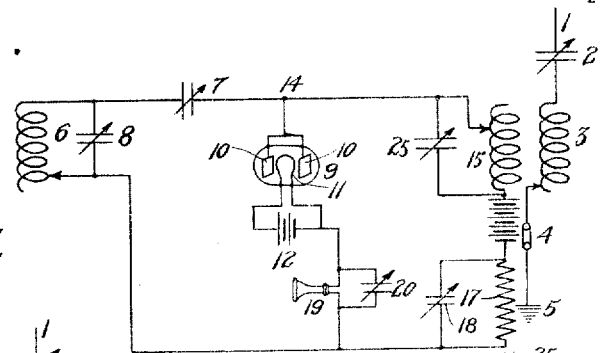
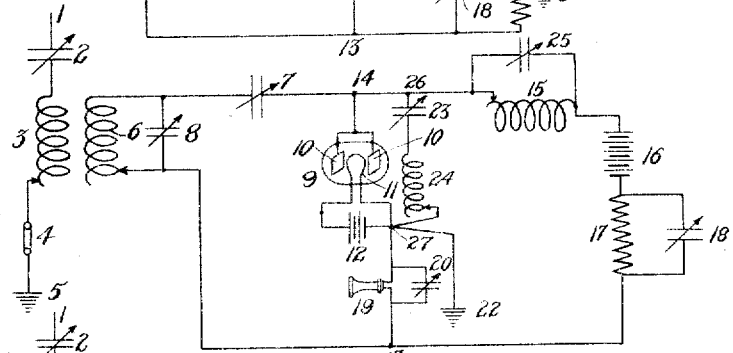
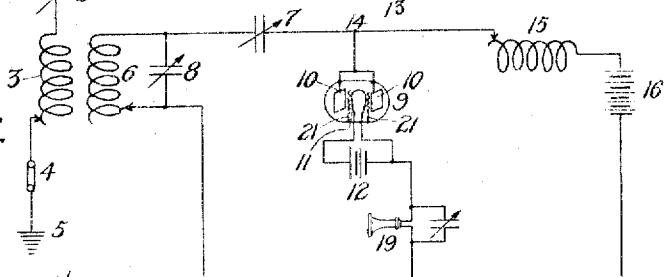
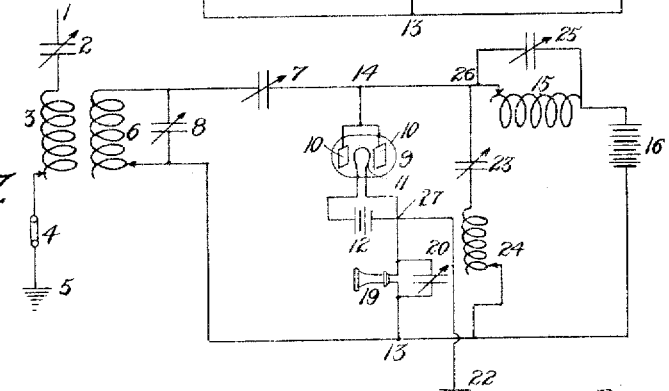
Inventor
Roy A. Weagant.
By his Attorneys
Sheffield Betts.

UNITED STATES PATENT OFFICE.

ROY A. WEAGANT, OF ROSELLE PARK, NEW JERSEY, ASSIGNOR TO MARCONI WIRELESS TELEGRAPH COMPANY OF AMERICA, A CORPORATION OF NEW JERSEY.

WIRELESS TELEGRAPHY.

1,306,208.        Specification of Letters Patent.        Patented June 10, 1919.

Application filed February 24, 1915. Serial No. 10,190.

*To all whom it may concern:*

Be it known that I, ROY A. WEAGANT, a citizen of the United States, and a resident of Roselle Park, in the county of Union, State of New Jersey, have invented certain new and useful Improvements in Wireless Telegraphy, of which the following is a specification.

My invention relates to improved apparatus for the detection, generation, transmission and amplification of feeble electrical impulses. Such impulses may be used in various ways and, while I shall describe my improved apparatus more particularly with reference to the transmission and reception of such impulses in wireless telegraphy, it will be understood that my improved apparatus may be used advantageously in connection with other uses of such feeble electrical impulses as, for instance, in connection with wire or wireless telephony or wire telegraphy. The apparatus I have illustrated, therefore, should be taken as showing an operative form thereof and a connection in which my said apparatus has proved operative and useful, and not the only form which it may take.

Nor do I intend to limit myself to any particular form or kind of electrical impulses, since my device may be used for the generation, detection or amplification of various kinds of electrical impulses, either damped or continuous.

More particularly my invention relates to circuit connections and methods of operation which include the vacuous detector, commonly known as the Fleming oscillation valve, an example of which may be found in the patent issued to J. A. Fleming, November 7, 1905, No. 803,684.

By the use of my improved apparatus, I am enabled to use the oscillation valve not only for detecting and amplifying feeble electrical impulses of both the damped and continuous varieties, but also to generate and transmit electrical oscillations which may be used in any desired way as, for instance, in wireless signaling.

By means of my improved apparatus, I may also use the same connections for both the transmission and detection of electrical oscillations, thus greatly simplifying the connections. My improved apparatus is simple, easy of adjustment and operation and, aside from its capacity to transmit oscillations, gives results in the reception of electrical oscillations which are much better than anything heretofore obtained by the use of such an oscillation valve so far as I am aware.

Figures 1, 2, 3, 4, 5, 6 and 7 show various connections embodying my invention applied to a wireless station which may be used either for transmission or reception.

In these drawings, 1 is an aerial, 2 the aerial series capacity, 3 the aerial tuning inductance, 4 an aerial key or switch of any suitable type; the aerial being grounded at 5. Coupled to the aerial by means of the secondary of an oscillation transformer 6, is a circuit which include two capacities 7 and 8, the former being in series and the latter in shunt to the secondary of the oscillation transformer. It will be understood that the coupling between the aerial and this circuit is not limited to the arrangement shown, but may be of any known form, also that the coupling need not be between coils 3 and 6, but may be between coils 3 and 15 as shown in Fig. 4, which will be described hereafter.

At 9 there is illustrated a Fleming valve comprising a vacuous vessel inclosing hot and cold elements. The particular form illustrated is that in which the cold or plate element is divided, as shown at 10. This valve, as is usual, includes a hot element in the form of a filament 11, which is heated by a battery 12, or other source of current. The filament, however, may be replaced by metallic mercury, and heated to form a mercury arc. The hot and cold elements are respectively connected to the circuit previously described at the points 13 and 14.

Connected in shunt with the circuit which has just been described and connected to the filament and plate elements of the valve is a second circuit, which includes a variable inductance 15, a battery or other source of current 16, and a resistance 17 in series. Resistance 17 is shunted by a condenser 18, the circuit being completed through the common wires leading from the plate elements to the point 14 and the filament element to the point 13. In the latter common wire I place a telephone or other indicating instrument 19, which may be shunted by a condenser 20, although the latter is not essential to the operation of my device.

In Fig. 2 I have shown a modification of my device, which consists in the introduction of a second cold element of the Fleming valve, this element being preferably perforated or in the form of a grid, is not externally connected as are the other two elements, and is preferably interposed between the cold or plate elements and the filament. This element 21 may be said to act as a bridge in the valve and increases the sensitiveness of the valve to some extent, the reason apparently being a modification of the electrostatic gradient between plate and filament.

In Fig. 3 I have shown a second modification of my apparatus, which consists in grounding the filament element of the valve as at 22, and introducing a circuit containing a capacity 23 and inductance 24 in series in shunt to the circuit containing the variable inductance 15, the battery 16, and resistance 17. In this case also I have shown a variable capacity 25 shunting inductance 15.

It will be understood that the shunting circuit, including capacity 23 and inductance 24, may be used in connection with either of the modifications shown in Figs. 1 and 2, and that the filament element may also be grounded in either of these modifications.

Also when the shunting circuit including condenser 23 and inductance 24 is used it may be connected either as shown in Fig. 3 or it may be connected across the points 26 and 27 as shown in Fig. 2.

A form of oscillation valve I find adapted to my invention is an oscillation valve of a relatively low vacuum in which mercury vapor is introduced and in which there is loosely placed an oxid of an alkaline metal as, for instance, calcium oxid. The use of the calcium oxid in this type of valve differs from the manner in which this substance has been heretofore used in apparatus of this type, in that, instead of coating the elements, a quantity of calcium oxid is placed loosely at the bottom of the vessel. I find that the use of calcium oxid greatly increases the permanency of the degree of vacuum of the valve probably by absorbing water vapor which may be present and aids in other ways in its operation, the exact mechanism of which is not fully understood but possibly is connected with the fact that the whole interior of the bulb becomes coated with a film of the oxid, or that the finely divided oxid enters into the conduction phenomena.

I have illustrated in the drawings a form of oscillation valve in which the elements have been divided, but this is obviously an equivalent form of the valve illustrated in the Fleming patent heretofore referred to, and I do not wish to confine myself to any particular form of element, or to the division thereof into any particular number of parts.

In the operation of my device as a receiver of electrical oscillations, I close switch 4 in the aerial circuit and tune the aerial to the periodicity of the received oscillations, in the ordinary manner. The circuit, including the secondary of the oscillation transformer, the valve 9, and the capacities 7 and 8, is tuned to substantially the same periodicity, or to some harmonic thereof, as is also the circuit including the valve 9, the variable inductance 15, the battery and the resistance. If the shunt circuit, which includes capacity 23 and variable inductance 24 is used, that circuit is tuned to the periodicity of the received oscillations, or to some harmonic thereof, and in that event the circuit including the variable inductance 15, the battery and the resistance may or may not be tuned.

In using this apparatus as a transmitter, the three circuits shown in Figs. 1 and 2 are tuned to substantially the same periodicity, to wit, that of the oscillations to be transmitted and the signals are produced by opening and closing the switch 4 in the aerial circuit at appropriate intervals. If the shunt circuit which includes capacity 23 and inductance 24 is used, and this circuit is tuned to the periodicity of the oscillations to be transmitted, the circuit including the variable inductance 15, the battery and resistance may or may not be tuned to the periodicity of the oscillations to be transmitted.

In receiving, the valve is preferably brought to a condition at which a blue glow may be seen in the globe. At this point the condition of the ionization of the gas in the valve may be adjusted to be very unstable. An important factor in reaching the adjustment of equilibrium of the ionization of the gas is resistance 17 and condenser 18. When this condition of unstable equilibrium is reached, the result of very small impulses due to received oscillations in the circuit of the secondary of the oscillation transformer is to cause large changes in the current flow from the battery 16 through the indicating instrument 19. This action is in a sense a trigger action and may be produced even though the inductance be adjusted to zero position. If, however, the inductance 15 be adjusted to tune its circuit to the periodicity of the received oscillations and is worked below the point at which the blue glow appears, the resistance 17 may be omitted, as shown in Figs. 6 and 7. The amplification produced when operating this way is of another type of action than the trigger action described above.

In the arrangement illustrated in Figs. 1 to 5 inclusive, both of these actions may be obtained simultaneously, owing to the presence of both the inductance and the resistance.

As I have pointed out above, many modifications of my improved apparatus will be apparent to those skilled in the art without departing from the spirit of my invention and I, therefore, do not intend to confine myself to the exact forms shown and described.

What I claim is:

1. In an apparatus of the kind described, two circuits, one of which has a natural frequency, which is a harmonic of that of the other, and an oscillation valve, said circuits being coupled through said valve.

2. In an apparatus of the kind described, an oscillation valve comprising two elements only; means for heating one of the elements; and a plurality of circuits, the periodicities of which bear a harmonic relation to each other, coupled to each other through said valve.

3. In an apparatus of the kind described, an oscillation valve comprising two elements only; means for heating one of said elements only; and two circuits, the periodicity of one being a harmonic of that of the other, coupled to each other by being connected to the same elements of said valve.

4. In an apparatus of the kind described, an oscillation valve comprising two elements only; means for heating one of said elements only; a circuit including a capacity and an inductance in series, connected to said heated and cold elements; a second circuit tuned to a periodicity which is a harmonic of that of the first circuit and containing an inductance, a source of current, and a resistance in series also connected to said heated and cold elements.

5. In an apparatus of the kind described, an aerial circuit tuned to a given periodicity, a second circuit turned to the same periodicity and connected to two elements of an oscillation valve; means for heating one of said elements of said valve only; and a third circuit connected to the same elements of said valve and containing in series an inductance, a battery, a resistance and an indicating instrument.

6. In an apparatus of the kind described, an oscillation valve comprising two elements; means for heating one of said elements; a circuit containing an inductance and a capacity in series; and a second capacity shunting said inductance connected to the two elements of said valve; a second circuit connected to the same elements of said valve, containing in series an inductance, a battery and a resistance, and a shunt connected across said second battery, containing an inductance and a capacity in series.

7. In an apparatus for wireless telegraphy comprising an oscillation valve containing two elements only, means for heating one of said elements only, a tuned circuit connected to said elements only, a second tuned circuit connected to said elements, and means for causing the valve to set up oscillations in the tuned circuits.

8. In an apparatus for wireless telegraphy, an aerial, an oscillation valve comprising two elements only, means for heating one of said elements only, and means for setting up oscillations in said valve and impressing said oscillations upon said aerial, comprising a plurality of circuits each tuned to the periodicity of the aerial and coupled together through said valve.

9. In an apparatus for wireless telegraphy, an aerial, an oscillation valve comprising two elements only, means for heating one of said elements only, and means for setting up oscillations in said valve and impressing said oscillations upon said aerial, comprising two circuits connected in shunt to one another and to the same elements of said valve, and each tuned to the periodicity of the aerial.

In testimony whereof I have signed this specification in the presence of two subscribing witnesses.

ROY A. WEAGANT.

Witnesses:
  WALTER S. JONES,
  M. M. RIEMANN.